United States Patent
Chang et al.

(10) Patent No.: US 7,046,863 B2
(45) Date of Patent: May 16, 2006

(54) OPTIMIZING THE ADVANTAGES OF MULTI-LEVEL RENDERING

(75) Inventors: Ching-Wei Chang, Vancouver, WA (US); Robert William Hurtz, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 639 days.

(21) Appl. No.: 10/106,999

(22) Filed: Mar. 25, 2002

(65) Prior Publication Data

US 2003/0179954 A1 Sep. 25, 2003

(51) Int. Cl.
*G06K 9/32* (2006.01)

(52) U.S. Cl. ............ 382/299; 358/3.01; 358/3.13; 358/3.3; 358/429; 358/456

(58) Field of Classification Search ........ 382/298–300; 345/611; 358/3.01–3.03, 3.06–3.09, 3.1, 358/3.3, 3.13–3.16, 3.21, 429, 456, 457, 358/298

See application file for complete search history.

(56) References Cited

U.S. PATENT DOCUMENTS

| | | | | |
|---|---|---|---|---|
| 4,437,122 A * | 3/1984 | Walsh et al. | ........ | 348/625 |
| 4,829,370 A * | 5/1989 | Mayne et al. | ........ | 358/537 |
| 5,193,008 A * | 3/1993 | Frazier et al. | ........ | 358/3.27 |
| 5,341,153 A * | 8/1994 | Benzschawel et al. | ........ | 345/694 |
| 5,459,484 A * | 10/1995 | Nguyen | ........ | 345/644 |
| 5,539,866 A * | 7/1996 | Banton et al. | ........ | 358/1.18 |
| 5,666,470 A | 9/1997 | Parker | ........ | 395/106 |
| 5,742,703 A | 4/1998 | Lin et al. | ........ | 382/176 |
| 5,798,846 A * | 8/1998 | Tretter | ........ | 382/262 |
| 5,905,820 A * | 5/1999 | Cushman et al. | ........ | 382/299 |
| 5,966,507 A | 10/1999 | Lin | ........ | 395/109 |
| 5,982,376 A * | 11/1999 | Abe et al. | ........ | 345/422 |
| 5,987,221 A * | 11/1999 | Bearss et al. | ........ | 358/1.9 |
| 6,072,588 A * | 6/2000 | Dohnomae | ........ | 358/1.9 |
| 6,178,011 B1 * | 1/2001 | Lin et al. | ........ | 358/1.9 |
| 6,198,467 B1 * | 3/2001 | Chiang | ........ | 345/698 |
| 6,219,025 B1 * | 4/2001 | Hill et al. | ........ | 345/589 |
| 6,330,344 B1 * | 12/2001 | Kondo et al. | ........ | 382/107 |
| 6,567,099 B1 * | 5/2003 | Dawson | ........ | 345/611 |
| 6,577,311 B1 * | 6/2003 | Crosby et al. | ........ | 345/428 |
| 6,678,426 B1 * | 1/2004 | Bearss et al. | ........ | 382/299 |
| 6,683,617 B1 * | 1/2004 | Naoi et al. | ........ | 345/613 |
| 6,731,301 B1 * | 5/2004 | Sato et al. | ........ | 345/613 |
| 6,771,266 B1 * | 8/2004 | Lui et al. | ........ | 345/442 |

* cited by examiner

FOREIGN PATENT DOCUMENTS

JP          10290367 A          2/1998

*Primary Examiner*—Bhavesh M. Mehta
*Assistant Examiner*—Manav Seth
(74) *Attorney, Agent, or Firm*—Michael Blaine Brooks, P.C.; Rosemarie F. Jones; David Ripma

(57) ABSTRACT

Systems and methods for optimizing the advantages of multi-level rendering of text and/or graphics at an output device by providing an alternate manner to perform multi-level rendering. A computer device, employed to render an image or graphical entity, is connected to an output device, and a request is received at the computer device to render a graphical entity at the output device. The resolution of the output device is identified and the data corresponding to graphical entity is translated to a resolution that is higher than the resolution of the output device. A conversion or translation is then performed to scale the image data from the higher resolution to the resolution of the output device. Optionally, a halftone matrix is employed to eliminate aliasing. The graphical entity is then more accurately rendered at the output device than by utilizing traditional techniques.

15 Claims, 3 Drawing Sheets

OPTIMIZING THE ADVANTAGES OF MULTI-LEVEL RENDERING

BACKGROUND OF THE INVENTION

1. Field of the Invention

The present invention relates to rendering text and/or graphics at an output device. More particularly, the present invention relates to systems and methods for optimizing the advantages of multi-level rendering of text and/or graphics at an output device by providing an alternate manner to perform multi-level rendering.

2. Background and Related Art

Currently computer systems that include a computer device and an output device, such as a printer or a monitor, utilize techniques to render text and/or images. The term rendering refers to a process of utilizing an output device to providing an abstract graphical entity, such as a line, a circle, a text character, or a sampled image.

A current technique for rendering an abstract graphical entity includes employing a raster output device by a process known as scan conversion. A raster includes the rectangular area of a display screen that is used to display abstract graphical entities or images. The raster is slightly smaller than the physical dimensions of the display screen and varies for different resolutions. For example, a video graphics array "VGA" resolution of 640 pixels×480 pixels on a 15-inch monitor produces one raster, whereas a super video graphics array "SVGA" resolution of 1,024 pixels×768 pixels produces a slightly different raster. The process of scan conversion determines which pixels to adjust and what values to assign those pixels to achieve the most faithful rendition possible at the resolution of the output device.

Pixels on a page or a screen are typically represented by a two-dimensional array of pixel values in computer memory. A single bit of computer memory is sufficient to represent each pixel for an output device whose pixels are only black or white, which is typically referred to as "bi-level rendering." In contrast, multiple bits of computer memory are required to represent each pixel for an output device whose pixels reproduce gray shades or colors, which is typically referred to as "multi-level rendering."

Multi-level rendering provides an advantage over bi-level rendering in that multi-level rendering typically provides increased realism or more exactly represents the true configuration of the abstract graphical entity. Thus, current raster image processing systems ("RIPs") that are only able to perform bi-level rendering are unable to utilize the advantages of multi-level rendering.

In attempt to utilize the advantage of multi-level rendering in raster image processing systems that are limited to bi-level rendering, techniques have been presented that utilize post-processing to enhance the edges of graphic entities. These techniques have proved to require a large amount of processing and/or have lacked in accurately representing a true image. Accordingly, it would be an improvement in the art to augment or even replace current techniques with other techniques in order to optimize the advantages of multi-level printing.

SUMMARY OF THE INVENTION

The present invention relates to rendering text and/or graphics at an output device. More particularly, the present invention relates to systems and methods for optimizing the advantages of multi-level rendering of text and/or graphics at an output device by providing an alternate manner to perform multi-level rendering.

Implementation of the present invention takes place in association with a computer device that is employed to render an image or graphical entity. The computer device is connected to an output device, such as a monitor or printer, to render the image respectively on a screen or a paper. The systems and methods of the present invention more accurately render the true configuration of the image.

Implementation of the present invention embraces the use of a resolution scan conversion that first translates a representation of an image to a higher resolution than the resolution of the output device and then translates the higher resolution image to the resolution of the output device resolution. Thus, for example, in one implementation of the present invention a request is received to render a graphical entity at an output device. The resolution of the output device is identified, and the data corresponding to graphical entity that is to be rendered is translated to a resolution that is higher than the resolution of the output device. A conversion or translation is then performed to scale the image data from the higher resolution to the resolution of the output device. Optionally, a halftone matrix is employed to eliminate aliasing. The graphical entity is then rendered at the output device. Accordingly, utilization of the systems and methods of the present invention more accurately render the true representation of the graphical entity.

While the methods and processes of the present invention have proven to be particularly useful in the area of printing a graphical entity, those skilled in the art will appreciate that the methods and processes of the present invention can be used in a variety of different applications to render text and/or graphics using any of a variety of output devices.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to rendering text and/or graphics at an output device. More particularly, the present invention relates to systems and methods for optimizing the advantages of multi-level rendering of text and/or graphics at an output device by providing an alternate manner to perform multi-level rendering.

In the disclosure and in the claims the term "graphical entity" shall refer to any character, image, line, representation, figure, or the like that may be rendered by an output device. Furthermore, the term "output device" shall refer to any machine, device or mechanism that is capable of representing information from a computer device. Examples of output devices include display screens, printers, plotters, and the like.

Embodiments of the present invention take place in association with a computer device that is employed to render a graphical entity. The computer device is connected to an output device to render the image. In accordance with embodiments of the present invention, the computer device employs a scan conversion that first translates a representation of a graphical entity to a higher resolution than the resolution of the output device and then translates the higher resolution image to the resolution of the output device.

The following disclosure of the present invention is grouped into two subheadings, namely "Exemplary Operating Environment" and "Optimizing the Advantages of Multi-Level Rendering." The utilization of the subheadings is for convenience of the reader only and is not to be construed as limiting in any sense.

Exemplary Operating Environment

Figure 1:
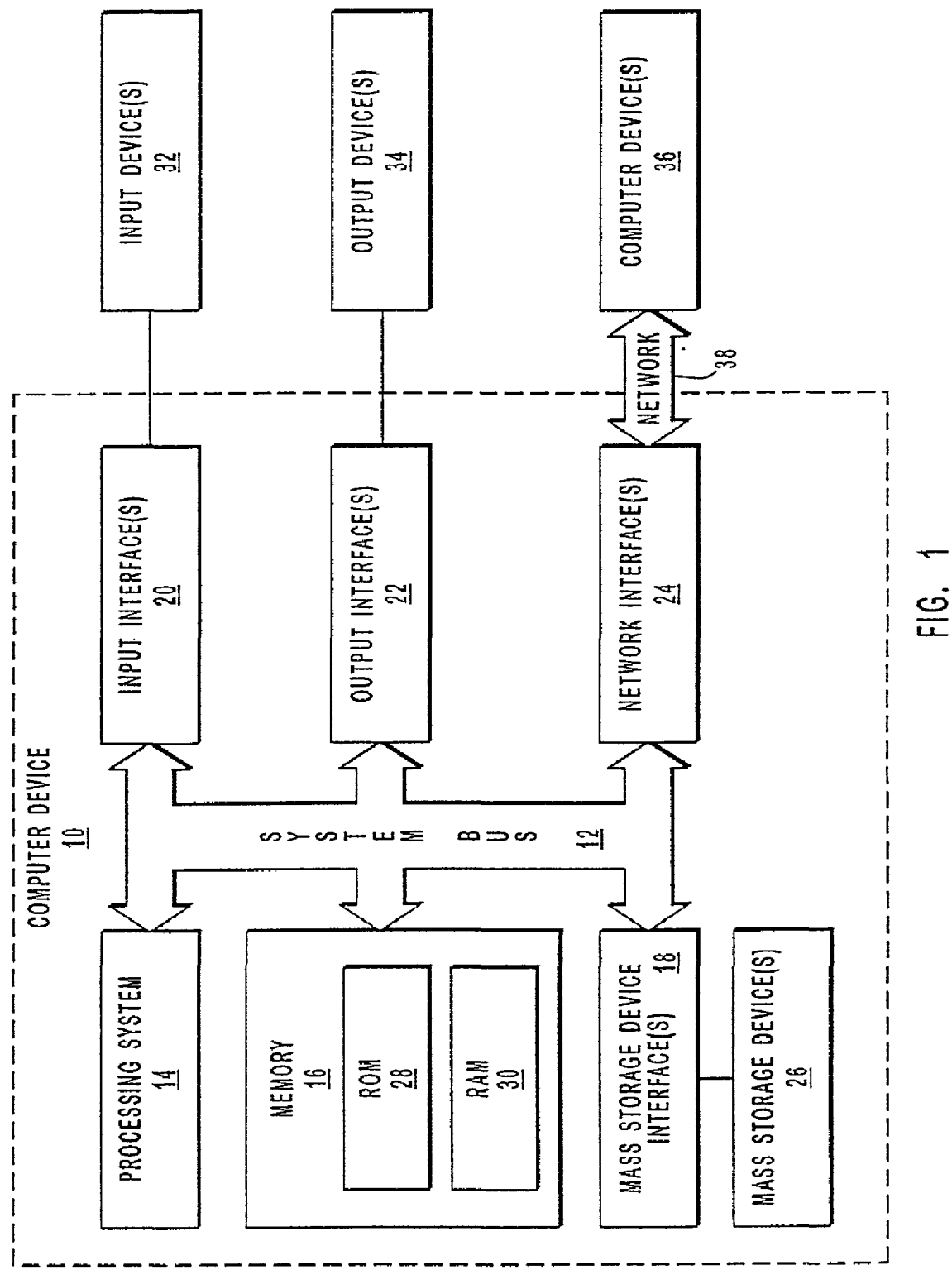
FIG. 1 illustrates a representative system that provides a suitable operating environment for use of the present invention.

FIG. 1 and the corresponding discussion are intended to provide a general description of a suitable operating environment in a graphical entity may be rendered in accordance with the present invention. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for rendering a graphical entity in accordance with the present invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a printer, a plotter, and the like. A particular output device 34 may be integrated with or peripheral to computer device 10. Examples of output interfaces include an adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices. Those skilled in the art will appreciate that the invention may be practiced in networked computing environments with many types of computer system configurations.

Optimizing the Advantages of Multi-Level Rendering

As provided above, embodiments of the present invention relate to optimizing the advantages of multi-level rendering of a graphical entity at an output device by providing an alternate manner to perform multi-level rendering, which includes utilizing a resolution scan conversion that first translates a representation of an image to a higher resolution than the resolution of an output device and then translates the higher resolution image to the resolution of the output device with multi-bit pixel data. Thus, for example, if the output device resolution is 600 dpi and is capable to print with 4-bit data, then the rendering of graphical entities will include translating the graphical entities to a 1200 dpi format and then to a 600 dpi format with 4-bit data for the output or rendering, as will be further discussed below.

Figure 2:
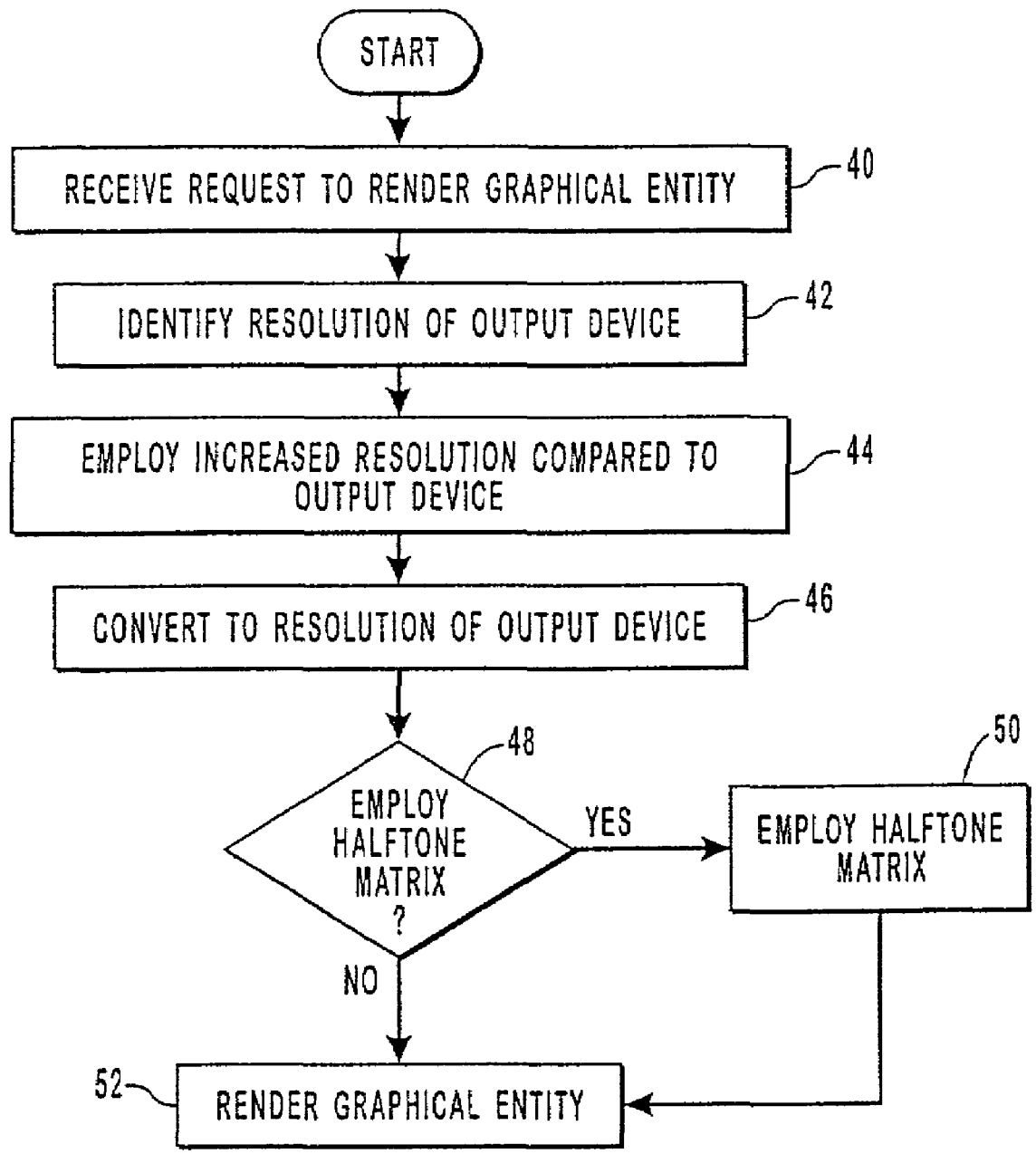
FIG. 2 is a flowchart that provides a representative embodiment for rendering a graphical entity in accordance with the present invention.

With reference to FIG. 2, a flowchart is illustrated that provides a representative embodiment for rendering a graphical entity in accordance with the present invention. In FIG. 2, execution begins at step 40 wherein a request is received by a computer device to render a graphical entity. At step 42, a resolution is identified of an output device that is to be used to render the graphical entity. For example, the resolution may be 600 dpi for an output device that is capable to render the graphical entity with 4-bit data, as provided above.

At step 44, an increased resolution, compared to the resolution of the output device, is employed. For example, increased resolution may be twice as high as the output device (e.g., 1200 dpi). While in the present example includes an output device resolution of 600 dpi and a higher resolution of 1200 dpi, those skilled in the art will appreciate that embodiments of the present invention embrace resolutions of the output device that may be greater than 600 dpi or less than 600 dpi. Similarly, those skilled in the art will appreciate that embodiments of the present invention embrace higher resolutions that are greater than 1200 dpi or less than 1200 dpi.

Thus, at step 44, the data corresponding to the graphical entity that is to be rendered is translated or converted to the higher resolution. This may be performed, for example, by subdividing each pixel that of the graphical entity into four uniform sub pixels. Execution then proceeds to Step 46 for the translation of the data from the higher resolution to the resolution of the output device.

Figure 3:
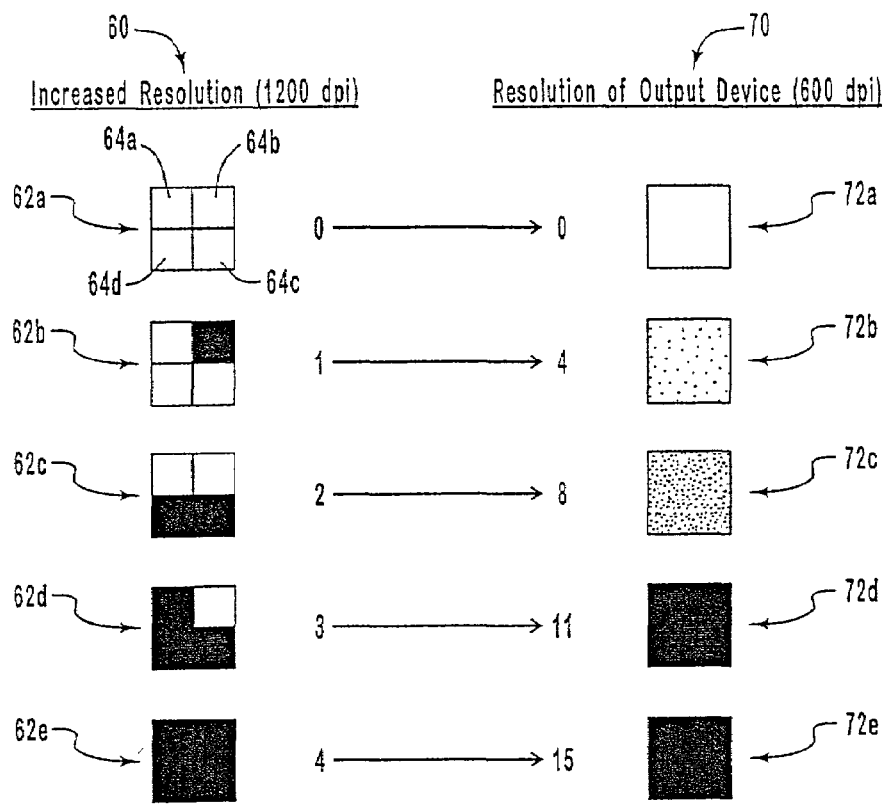
FIG. 3 illustrates a representative illustration for converting pixels from a higher resolution to the resolution of the output device.

By way of example, and with reference to FIG. 3, a representative illustration for converting pixels from a higher resolution to the resolution of the output device. In FIG. 3, a first column 60 corresponds to an increased resolution (e.g., 1200 dpi) and a second column corresponds to the resolution of the output device. In one embodiment, the data is selectively scaled or translated down from the increased resolution to resolution of the output device by assigning four contiguous sub pixels 64 of the increased resolution to a single pixel set 62a, wherein the pixel set 62a of the increased resolution corresponds to a single pixel 72a of the resolution of the output device.

Step 46 of FIG. 2 includes providing a weighting amount to a pixel 72 depending on the weighting or shading of a corresponding pixel set 62. For example, a ratio is established such that if none of the sub pixels that make up a given pixel set 62 are shaded at the increased resolution (see pixel set 62a), the corresponding pixel 72 of the output device resolution is correspondingly not shaded (see pixel set 72a). However, if any one of the sub pixels that make up a given pixel set 62 is shaded at the increased resolution (see pixel set 62b), the corresponding pixel 72 of the output device resolution is accordingly provided a low shading (see pixel set 72b). Similarly, if any two of the sub pixels that make up a given pixel set 62 are shaded at the increased resolution (see pixel set 62c), the corresponding pixel 72 of the output device resolution is correspondingly given a medium shading (see pixel set 72c). And, if any three or all four of the sub pixels that make up a given pixel set 62 are shaded at the increased resolution (see pixel sets 62d–62e), the corresponding pixel 72 of the output device resolution is correspondingly provided a heavy shading (see corresponding pixel sets 72d–72e).

Figure 4:
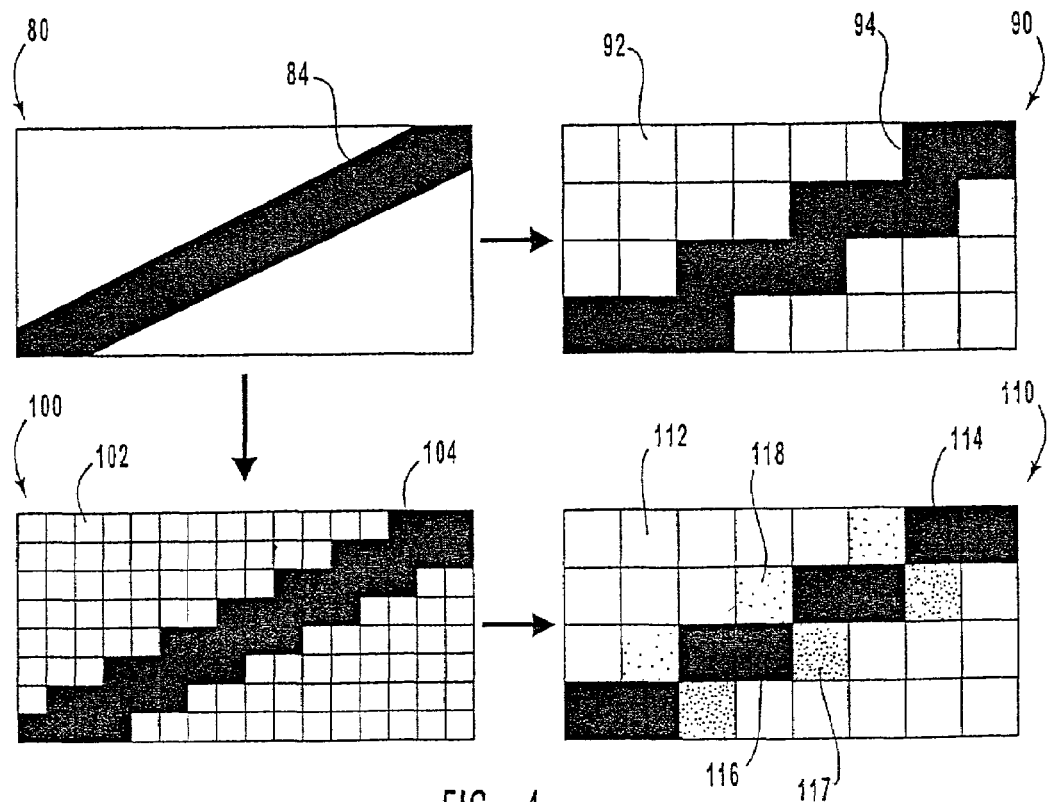
FIG. 4 illustrates a representative illustration for rendering a graphical entity on an output device upon using a higher resolution and conversion.

This technique is more fully learned through the use of FIG. 4. Rendering 80 provides an original graphical entity 84 that is to be rendered using an output device. Output 90 represents a typical rendering of original graphical entity 84 on a 600 dpi pixel grid 92 and is illustrated as image 94, which generally provides jagged edges that are visible to the human eye that distort the true configuration of the original graphical entity 84.

In contrast, output 100 represents a typical rendering of original graphical entity 84 on a 1200 dpi pixel grid 102 and is illustrated as image 104. While image 104 also provides jagged edges that distort the true configuration of the original graphical entity 84, image 104 is a closer representation to the true original graphical entity 84 than image 94.

Output 110 represents a typical translation of image 104 from a 1200 dpi pixel grid 102 to a 600 dpi pixel grid 112, and is illustrated as image 114. As illustrated four contiguous pixels of grid 102 correspond to one pixel of grid 112. Further, the weighting factor disclosed above in relation to FIG. 3, wherein particular shading is provided to one of the pixels 112 depending on the number of corresponding pixels from grid 102 that are shaded. Thus, as illustrated, image 114 includes pixels that have no shading, pixels (e.g., pixel 118) that have light shading, pixels (e.g., pixel 117) that have medium shading, and pixels (e.g., pixel 116) that have heavy shading. Therefore, while image 114 still includes ragged edges, image 114 more closely resembles original graphical entity 84 than image 94, even though both grids 92 and 112 are 600 dpi grids.

This invention uses a higher resolution scan conversion than the output device resolution and then converts back to the device resolution with a multi-bit pixel data. For example, if the output device is in 600 dpi and is capable to print with 4-bit data, then the rendering of graphic entities will in, say 1200 dpi, and convert back to 600 dpi with 4-bit data for the output. The prior art does the post-process, uses some algorithm to manipulate the halftone image.

Thus, with reference back to FIG. 2, once the increased resolution has been employed at step 44 and the conversion to the output resolution has occurred at step 46, which includes translating all of the data relating to the graphical entity from the higher resolution to the lower resolution, execution proceeds to decision block 48.

At decision block 48, a determination is made as to whether or not to employ a halftone matrix to a rendered image. A halftone matrix is used to avoid a problem with aliasing. The design of the halftone matrix is based on the output device resolution, with multi-level halftoning. For example, if the output device is in 600 dpi and the higher resolution used in accordance with the present invention is 1200 dpi, a first a 600 dpi 4-bit halftone matrix is designed and then for each multi-level halftone pixel it will be expanded to 2 by 2 halftone pixels. This is a backwards design for the 1200 dpi binary halftone matrix where perfect rendering is known so that the conversion to the 1200 dpi halftone image may be made back to 600 dpi, with 4-bit data. Since a reconstructed 600 dpi halftone dot has the exact size and position as an original 600 dpi halftone dot before expanding to 1200 dpi, the aliasing does not occur.

Thus, if it is determined at decision block 48 that a half tone matrix is to be employed, execution proceeds to step 50 to employ the half tone matrix and then to step 52. Alternatively, if no halftone matrix is to be employed, execution proceeds directly to step 52. At step 52, the graphical entity is rendered using the output device.

Therefore, as illustrated herein, embodiments of the present invention use a higher resolution scan conversion than the output device resolution, and then convert back the data to the device resolution with a multi-bit pixel data. As provided herein, if the output device is in 600 dpi and is capable to print with 4-bit data, then the process translates the graphic entities in 1200 dpi and converts the entities back to 600 dpi with 4-bit data for the output.

Since the 1200 dpi to 600 dpi pixel mapping is a 4 pixel (2 by 2) to a 1 pixel map, the conversion is simply counting every 2 by 2 area to form a multi-level pixel in 600 dpi. The possible output values for the 600 dpi pixel are 0, 1, 2, 3, and 4. Since a 2-bit data can only hold the value up to 3. The 4-bit data may be used to hold all five values and scale the value as 0 0, 1 4, 2 8, 3 11, and 4 15, as illustrated in FIG. 3. As provided above, a halftone matrix may be used to avoid an aliasing problem.

While the examples herein have related to an output resolution of 600 dpi and a higher resolution of 1200 dpi, those skilled in the art will appreciate that embodiments of the present invention embrace the use of output resolutions that are higher or lower than 600 dpi and/or higher resolutions that are higher or lower than 1200 dpi.

Thus, as discussed herein, the embodiments of the present invention embrace systems and methods for optimizing the advantages of multi-level rendering of text and/or graphics at an output device by providing an alternate manner to perform multi-level rendering. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for rendering a graphical entity, the method comprising the steps of:
   receiving the graphical entity for output by a printer, wherein the printer is adapted to output multi-bit data pixels and wherein the printer is configured to render at a printer resolution;
   translating the graphical entity into a first raster graphical entity comprising a plurality of single-bit pixels, the first graphical entity at a first resolution, wherein the first resolution is higher than the printer resolution;
   performing a halftone process on the first graphical entity by employing a halftone matrix based on an intermediate halftone matrix at the printer resolution comprising a plurality of multi-bit halftone pixels and wherein each of the multi-bit halftone pixel in the intermediate halftone matrix is expanded to create the halftone matrix at the first resolution; and
   translating the first graphical entity into a second raster graphical entity by dividing the plurality of single-bit pixels of the first graphical entity into grids of pixels, the second graphical entity is scaled down from the first graphical entity by mapping each grid of the grids of pixels of the first graphical entity into a corresponding multi-bit pixel of the second graphical entity, and wherein the second raster graphical entity is at the printer resolution;
   wherein the step of performing the halftone process is prior to the step of translating the first graphical entity into the second graphical entity;
   wherein the step of translating the first graphical entity into the second graphical entity is based on the haiftoned first graphical entity.

2. The method of claim 1 wherein the method further comprises the step of:
   performing a halftone process on the second graphical entity.

3. The method of claim 1 wherein the first resolution is four times the printer resolution.

4. The method of claim 1 wherein the mapping of each grid of the grids of pixels into a corresponding multi-bit pixel is based on a weighting factor.

5. The method of claim 1 further comprising the step of sending the second graphical entity to a printer for rendering.

6. A rendering system configured to enhance the rendering of a graphical entity, the system comprising:
- a printer configured to render the graphical entity at a printer resolution and wherein the printer is configured to output multi-bit data pixels; and
- a processor operably coupled to the printer, the processor adapted to:
  - translate the graphical entity into a first raster graphical entity comprising a plurality of single-bit pixels, the first graphical entity at a first resolution, wherein the first resolution is higher than the printer resolution;
  - perform a halftone process on the first graphical entity by employing a halftone matrix based on an intermediate halftone matrix at the printer resolution comprising a plurality of multi-bit halftone pixels and wherein each of the multi-bit halftone pixel in the intermediate halftone matrix is expanded to create the halftone matrix at the first resolution of the first raster graphical entity;
  - translate the first graphical entity into a second raster graphical entity by dividing the plurality of single-bit pixels of the first graphical entity into grids of pixels, wherein the processor is further adapted to scale down the second graphical entity from the first graphical entity by mapping each grid of the grids of pixels of the first graphical entity into a corresponding multi-bit pixel of the second graphical entity, and wherein the second raster graphical entity is at the printer resolution;
    - wherein the processor is further adapted to perform the halftone process prior to the step of translating the first graphical entity into the second graphical entity;
    - wherein processor is further adapted to translate the first graphical entity into the second graphical entity based on the haiftoned first graphical entity; and
    - send the second graphical entity to the printer.

7. The system of claim 6 wherein the processor is further adapted to perform a halftone process on the second graphical entity.

8. The system of claim 6 wherein the first resolution is four times the printer resolution.

9. The system of claim 6 wherein the mapping of each grid of the grids of pixels into a corresponding multi-bit pixel is based on a weighting factor.

10. A computer program product for implementing within a computer system a method for rendering a graphical entity, the computer program product comprising:
- a computer-readable medium for providing computer program code means for rendering the graphical entity, wherein the computer program code means comprises executable code for implementing the steps of:
  - receiving the graphical entity for output by a printer, wherein the printer is adapted to output multi-bit data pixels and wherein the printer is configured to render at a printer resolution;
  - translating the graphical entity into a first raster graphical entity comprising a plurality of single-bit pixels, the first graphical entity at a first resolution, wherein the first resolution is higher than the printer resolution;
  - performing a halftone process on the first graphical entity by employing a halftone matrix based on an intermediate halftone matrix at the printer resolution comprising a plurality of multi-bit halftone pixels and wherein each of the multi-bit halftone pixel in the intermediate halftone matrix is expanded to create the halftone matrix at the first resolution of the first raster graphical entity; and
  - translating the first graphical entity into a second raster graphical entity by dividing the plurality of single-bit pixels of the first graphical entity into grids of pixels, the second graphical entity is scaled down from the first graphical entity by mapping each grid of the grids of pixels of the first graphical entity into a corresponding multi-bit pixel of the second graphical entity, and wherein the second raster graphical entity is at the printer resolution;
  - wherein the step of performing the halftone process is prior to the step of translating the first graphical entity into the second graphical entity;
  - wherein the step of translating the first graphical entity into the second graphical is based on the halftoned first graphical entity.

11. The computer program product of claim 10 wherein the computer program code means further comprises executable code for further implementing the step of performing a halftone process on the second graphical entity.

12. The computer program product of claim 10 wherein the first resolution is four times the printer resolution.

13. The computer program product of claim 10 wherein the mapping of each grid of the grids of pixels into a corresponding multi-bit pixel is based on a weighting factor.

14. The computer program product of claim 10, wherein the computer program code means further comprises executable code for further implementing the step of sending the second graphical entity to the printer for printing.

15. The computer program product of claim 10, wherein the computer program product is via a communication connection.

* * * * *